United States Patent [19]
Douglas-Hamilton

[11] 3,883,413
[45] May 13, 1975

[54] OZONE GENERATOR USING PULSED ELECTRON BEAM AND DECAYING ELECTRIC FIELD

[75] Inventor: Diarmaid H. Douglas-Hamilton, Boston, Mass.

[73] Assignee: Avco Corporation, Everett, Mass.

[22] Filed: May 20, 1974

[21] Appl. No.: 471,725

Related U.S. Application Data

[63] Continuation-in-part of Ser. No. 291,823, Sept. 25, 1972, abandoned.

[52] U.S. Cl. ............... 204/176; 250/427; 250/432; 250/492; 250/531; 250/532; 250/535
[51] Int. Cl. ..................... C01b 13/00; C01b 13/12
[58] Field of Search ............ 204/176; 250/432, 492, 250/531–547

[56] References Cited
UNITED STATES PATENTS
3,702,973  11/1972  Daugherty et al. ............. 204/176 X
3,711,387  1/1973  Kasamatsu et al. ........... 204/157.1 H OTHER PUBLICATIONS
Chem. Abst., Vol. 61, 7861f (1964).
Chem. Abst., Vol. 57, 10717a (1962).
Chem. Abst., Vol. 63, 14245g (1965).
Chem. Abstr. Vol. 58, 9787e (1963).
Chem. Abstr., Vol. 60, 15383d (1964).

*Primary Examiner*—John H. Mack
*Assistant Examiner*—Aaron Weisstuch
*Attorney, Agent, or Firm*—Charles M. Hogan; Irwin P. Garfinkle

[57] ABSTRACT

The disclosed system functions to generate ozone with improved efficiency. Oxygen gas is passed through an electric field, and while in the field is irradiated with brief bursts of high energy electrons. This produces a large number of secondary electrons in the gas and these electrons taken energy from the electric field. The secondary electrons efficiently dissociate oxygen molecules from the gas, thereby producing oxygen atoms which immediately combine with oxygen to form ozone. The electric field is pulsed on during the electron beam irradiation, and thereafter pulsed off in order to maximize energy deposition by electrons and minimize energy deposition by ions.

The disclosed system may also be used to generate other substances in gas phase ionic or free-radical reactions in which a suitable gas or mixture of gases is passed through the discharge and made to react in it. For example, the system can be used to produce hydrogen peroxide or hydrazine from suitable gas mixtures of $H_2O + O_2$ and $NH_3 + N_2$, respectively.

3 Claims, 5 Drawing Figures

OZONE GENERATOR USING PULSED ELECTRON BEAM AND DECAYING ELECTRIC FIELD

This is a continuation in part of application Serial No. 291,823 filed September 25, 1972, now abandoned.

BACKGROUND OF THE INVENTION

In the known prior art devices ozone is produced by slowly passing oxygen or air through long discharge tubes which consist of concentric glass cylinders which are metal coated on the innermost and outermost walls, the gas passing between the cylinders. Low frequency, high voltage alternating current is applied to the metal coatings and ozone is formed in the gas. The discharge produced is capacitatively ballasted. This process has been found to be inefficient and slow.

Typical prior art ozone generators are shown in patents to Hartman, U.S. Pat. No. 2,089,793, Daily 2,118,969, Ronzi 2,095,651, Allison 2,429,152, Allison 2,404,778, Allison 2,405,728, Tepe et al. 2,320,151, and Denis 3,280,018.

In the known prior art devices ozone is produced together with positive and negative ions, and the ions are removed by ion-ion recombination, a process proportional to the square of the ion density. Some atomic oxygen is produced during this recombination process. The ions take energy from the ozonator electric field and heat the gas by collisions with gas molecules; and thus the efficiency of the ozonator will depend on the fraction of energy imparted to the gas by electrons as compared with that imparted by ions. Massive cooling of the capacitatively ballasted walls is required to prevent thermal decomposition of the ozone produced.

This invention recognizes that ozone is more efficiently generated by increasing the ratio of the current carried by electrons relative to that carried by ions in the gas. The electron current is the only component of the current capable of producing ozone by dissociating oxygen molecules. Consequently, increasing the electron:ion density ratio will increase the efficiency with which ozone is produced. The invention generates ozone by irradiating oxygen gas in an electric field with the electron beam of an electron beam gun. The electron beam gun operates in short bursts, and the electric field is removed after each irradiation.

Since secondary electrons are produced by the electron beam and lost by attachment, while negative ions are produced by attachment and lost by recombination with positive ions, it follows that when the electron beam is turned on, there is a short time during which the current of secondary electrons is higher than the ion current. That is to say, the energy imparted to the gas by electrons will be greater than that imparted by ions and ozone will be produced with high electrical efficiency at the beginning of the discharge. After a brief period, the ion current exceeds the electron current. At this time, the sustainer field is removed, and no energy is imparted to the gas. After the field has been removed, a short interval is allowed to permit the ions time for mutual neutralization, and then another pulse of high energy electrons is applied to the gas and the same process repeats itself. The net rate at which ozone can be produced by this method is many times higher than in conventional devices, and the electrical efficiency is higher by a factor between 2 and 4.

For a better understanding of the nature of this invention, reference should now be made to the following specification and to the accompanying drawings in which.

DESCRIPTION OF THE INVENTION

Figure 1:
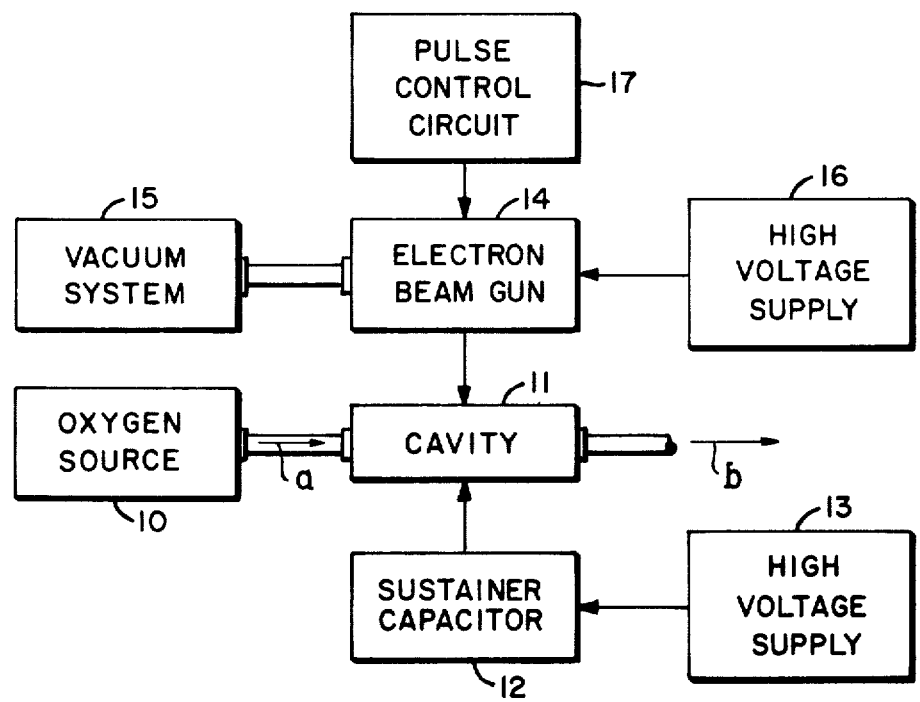
FIG. 1 is a block diagram of a system for producing ozone.

Referring to the block diagram in FIG. 1, oxygen gas from a source 10 is passed through a cavity 11 across which an electric field is provided by means of a sustainer capacitor 12, charged from a high voltage supply 13. The oxygen gas flowing through the cavity 11 is irradiated with the output from an electron beam gun 14. The electron beam gun is maintained in a vacuum by means of a conventional vacuum system 15 and is energized by a high voltage supply 16. Operation of the electron beam gun 14 is controlled by a pulse control circuit 17 so that the oxygen gas is irradiated with the brief bursts of high energy electrons generated in the electron beam gun 14.

Figure 3:
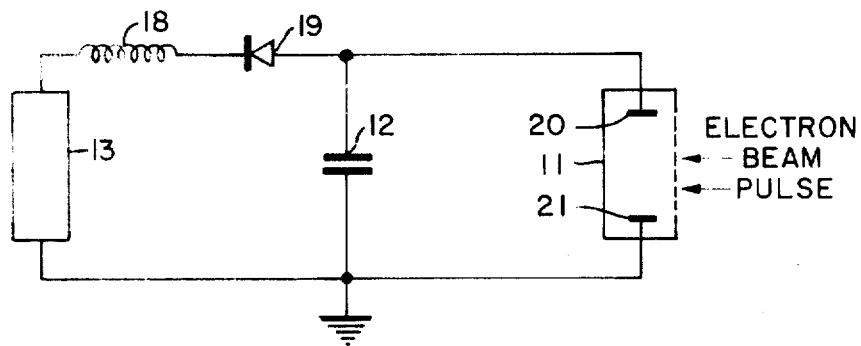
FIG. 3 is a block diagram of the sustainer capacitor circuit.

As seen in FIG. 3, the sustainer capacitor 12 is charged by the power supply 13 through a choke 18 and a diode 19. The plates of the sustainer capacitor 12 are connected to electrodes 20 and 21 positioned across the cavity 11 through which the oxygen gas is passed. As will be further explained below, the electrode 20 is an anode and electrode 21 is a cathode for collecting and accelerating electrons within the cavity 11. The power supply 13 charges the capacitor 12 at a rate determined primarily by the choke 18 to establish the required electric sustainer field across the cavity 11. When the oxygen gas flowing through the field is irradiated with an electron beam pulse, the gas within the cavity 11 becomes conductive, and this discharges the capacitor 12 between the electrodes 20 and 21. After the electron beam energy is removed, the gas again becomes non-conductive and the capacitor 12 is again charged. When the electron beam gun emits another beam of electrons, the cycle is repeated. During the period when capacitor 12 is being recharged, the ions which are produced during the discharge recombine with each other and are neutralized.

Figure 2:
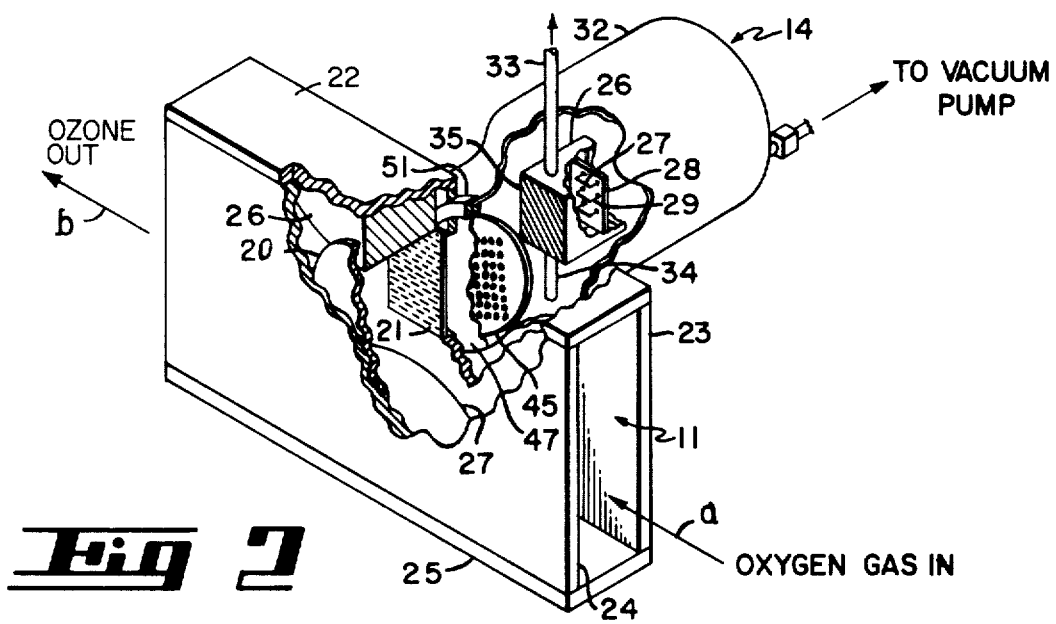
FIG. 2 shows apparatus suitable for use in carrying out the described process.

The apparatus for carrying out this invention is pictorially shown in FIG. 2. The cavity 11 comprises a generally rectangular passageway formed by a plurality of walls 22, 23, 24 and 25. The various elements defining the cavity 11 are comprised of an electrically non-conductive and chemically non-reactive material such as, for example, glass, quartz or Teflon. Oxygen gas is admitted under pressure at the inlet end of the cavity. A mixture of oxygen and ozone exits from the outlet end of the cavity.

The side wall 23 of the cavity 11 is provided with a circular opening to sealably receive the electron gun 14 while the side wall 24 is recessed to receive the electrode 20.

The electron gun 14 may be constructed in any conventional way provided it has the capacity for generating the required high energy electron beam. The illustrated electron beam gun 14 includes a rectangular electron source comprising an electrically conductive enclosure 26 open at the forward end. Electrons are generated within the enclosure 26 by thermionic emission from a plurality of spaced filaments 27 which are supported within the rear portion of enclosure 26 by an electrically non-conductive plate 28. The filaments 27 are supported by electrically conductive stand-offs 29 which are coupled to a source of filament current (not shown). The filaments 27 are heated conventionally to produce thermionic emission.

Enclosure 26 is insulated from the outer cylindrical wall 32 by means of supports 33 and 34 which also provide a conduit for the electrical connections to the pulse control circuits 17. A reticulated screen grid 35 covers the open end of the enclosure 26. The output of the pulse control circuit 17 is applied to the grid 35 to provide the control voltages for determining the duration and pulse repetition rate of high energy electrons released by the electron gun into the flowing oxygen gas. Broadly, the electron beam gun 14 provides an abundance of high energy electrons which are defocused and directed toward the cavity 11 through the screen grid 35. The volume surrounding the electron gun within wall 32 is conventionally evacuated by vacuum system 15 and the electron beam gun is maintained at low pressure to provide an optimal environment for the passing of free electrons through the screen grid 35.

Electrons passing through the screen grid 35 are accelerated toward a reticulated electrically conducting plate 45 made of stainless steel or the like and maintained at a potential which is positive compared to that of the screen grid 35. Generally the plate 45 is at ground potential and the screen grid 35 is at a high negative potential. The plate 45 is provided with a plurality of holes through which the generated electrons may pass. A diaphragm 47 disposed between the cavity 11 is supported by the plate 27 and it possesses adequate structural stability to maintain the required pressure differential between the vacuum within the electron gun 14 and the pressurized flow of oxygen gas within the cavity 11. While preferably the diaphragm 47 is composed of a metal, it may also be composed of other materials which may be non-conductive.

Electrons from the screen grid 35 flow through the diaphragm 47 and enter the cavity 11 after passing through the electrode 21, a reticulated cathode which is constructed of wire mesh and insulated from the electron gun 14 by a ring of nonconducting material 51. The required sustainer electric field is maintained between the electrodes 20 and 21 which comprise, respectively, an anode and a cathode. The voltage developed across these electrodes is established by the sustainer capacitor 12.

Operation

Oxygen gas under pressure is pumped through the cavity 11 in the direction indicated by the arrows a and b at the cavity inlet and outlet, respectively. The high voltage from the power supply 13 serves to charge the sustainer capacitor 12 to a predetermined level for establishing a sustainer electric field between the anode 20 and the cathode 21. The pulse control circuit 17 controls the electron beam gun so that it provides short duration bursts of electrons which pass from the electron gun through the cathode 21 to the anode 20. The presence of electrons within the gas stream creates a low impedance path between the electrodes 20 and 21, thereby essentially short-circuiting the plates of the capacitor 12 so that the sustainer voltage is discharged. After a subsequent neutralization, the sustainer voltage is re-established at a rate determined by the choke 18 and the subsequent generation of a burst of electrons from the electron gun 14 repeats the process.

Improved efficiency in the production of ozone is realized by maximizing the residence time of electrons and minimizing that of negative and positive ions in the oxygen gas. Electrons are lost primarily by electron-neutral attachment at a rate proportional to the electron number density, whereas ions are lost primarily by ion-ion recombination, a process proportional to the square of the ion density. Consequently, at a sufficiently high electron production rate the electron number density will exceed the ion density, while at a certain lower electron production rate the electric current carried by the electrons will exceed that carried by the ions in the discharge.

The disclosed system causes the secondary electrons to extract energy from the superimposed electric field (the sustainer field), and impart such energy to the gas in the form of molecular excitation and dissociation. At the same time, the process minimizes the amount of energy extracted from the sustainer field by ions and this is advantageous since such energy is wasted, and merely serves to increase the gas kinetic temperature. The mean ion drift velocity in the regions of gas temperature and E/N attainable is very close to the gas kinetic velocity where E is the electric field and N is the gas number density.

Figure 4:
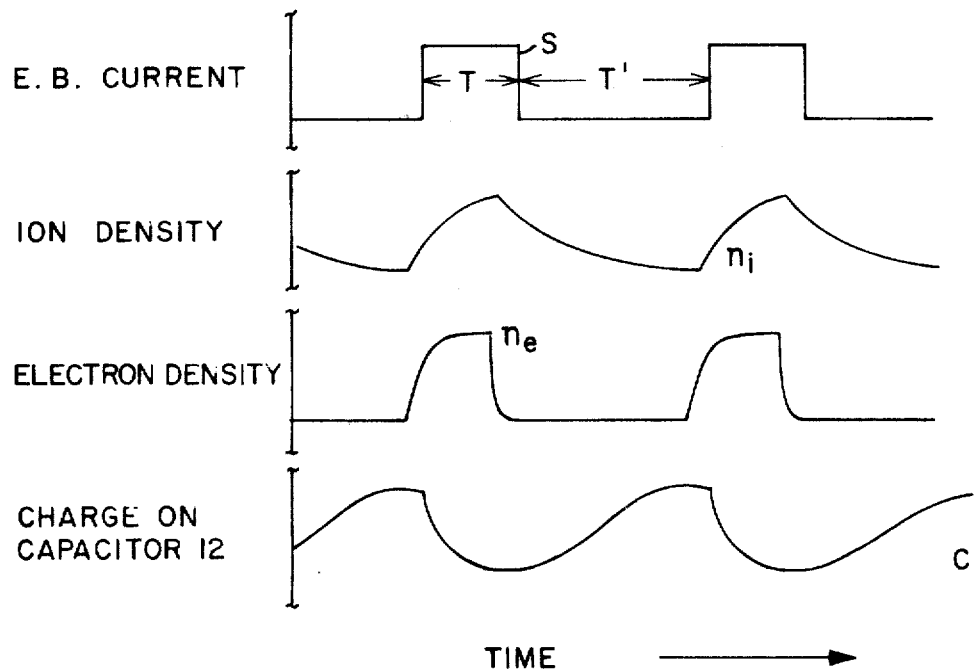
FIG. 4 is a series of curves showing the generation of ions and electrons in response to electron beam irradiation of the gases flowing through an electric field.

The curves in FIG. 4 show the theoretical relationships of the various parameters on a common time scale. The curve S shows the beam pulse having a duration T and a pulse interval T'. The curve $n_i$ shows the ion density, while the curve $n_e$ shows the electron density. The curve C shows the charge on the sustainer capacitor 14. The system is arranged so that the gas takes energy from the electric sustainer field only when the electron component of the current greatly exceeds the ion component, and hence the production of ozone is made as efficient as possible.

Other Uses

It is to be noted that the method outlined above may be used in any chemical reaction process in which electron attachment and negative ion formation is important. The process of pulsing the electron beam permits the majority of the energy to be introduced by the electrons, while adjusting the voltage between the cathode and anode permits one to tune the energy of the electrons to that value most capable of causing the specific excitation required.

Examples of other chemicals which can be made are the following:

1. Hydrogen Peroxide ($H_2O_2$) can be formed from $H_2O + O_2$ or $H_2 + O_2$;
2. Hydrazine ($N_2H_4$) can be formed from $NH_3$ or $NH_3 + N_2$ or $N_2 + H_2$.
3. Acetylene ($C_2H_2$) can be formed from $CH_4$.
4. Cyanogen ($C_2N_2$) can be formed from $C_2H_2 + N_2$.

The foregoing products are cited by way of example only, and no limitation as to the various uses of the invention is intended. While the efficiency with respect to certain gases may render the manufacture of certain products less practical than others, this invention may be used to produce a wide variety of products.

Figure 5:
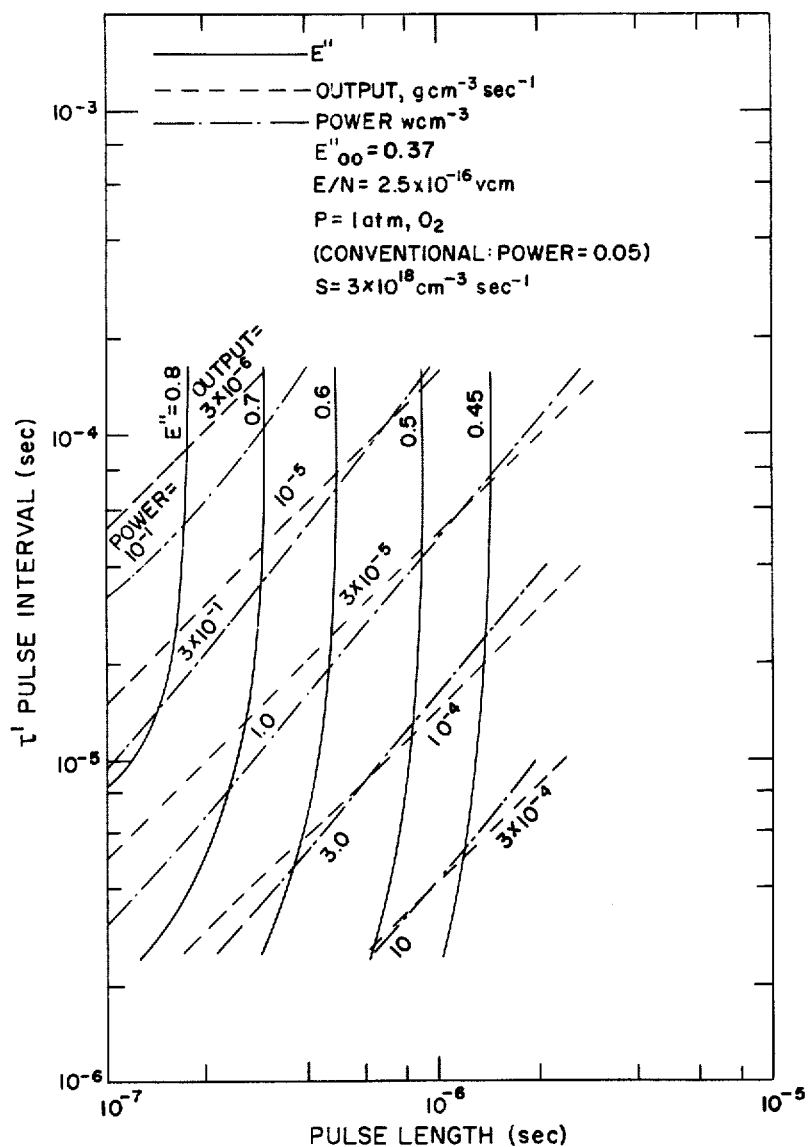
FIG. 5 is a series of curves illustrating the operation of an ozonator made in accordance with this invention.

Calculations of the behavior of an ozonator have been made. In FIG. 5, the predicted values of power input density and ozone output, measured in watts per $cm^3$ and grams per second per $cm^3$ respectively, are shown as function of electron beam pulse length (T), and interval between electron beam pulses (T'). The number E'' is proportional to the efficiency of ozone production, E'' = 1 corresponding to maximum theoretical efficiency.

An acceptable design point exists at the position marked with a dot, $T' + 10^{-5}$ sec, $T = 2 \times 10^{-7}$ sec. The design parameters corresponding to this point are summarized below.

| | |
|---|---|
| Electron beam pulse length | $2 \times 10^{-7}$ sec |
| Interval between electron beam pulses | $10^{-5}$ sec |
| Electron beam intensity | $3 \times 10^{-3}$ A/cm$^2$ |
| Electron beam voltage | 100 kV |
| Sustainer electric field | 6000 v/cm |
| Gas pressure | 1 atm |
| Ozonator height (discharge chamber) | 10 cm |
| Ozonator width (discharge chamber) | 10 cm |
| Ozonator length (discharge chamber) | 10 cm |
| Ingoing gas composition | 100% $O_2$ |
| Outgoing gas composition | 0.4% $O_3$ by wt |
| Efficiency of ozone production | ~3 kwh/lb |
| Gas flow rate | 63 cm/sec |
| Volume flow rate | 6.3 litre/sec |
| Power consumption rate | ~800 watts |

The ozonator discharge dimensions have been arbitrarily selected as a 1 litre discharge cavity. It must be emphasized that the above figures represent typical operating conditions, but in no way represent the only workable values.

I claim:

1. A method of generating ozone comprising the steps of:

providing a supply of pressurized oxygen gas;

generating a controllable beam of high energy electrons;

producing a controllable electric field;

passing said gas through said field;

irradiating said gas in said field with short bursts of said high energy electrons; and thereafter reducing said electric field after each electron burst by conduction through ionized gas produced by said electron burst until the next irradiation of said gas with said high energy electrons.

2. The invention as defined in claim 1 wherein said controllable electric field is produced by charging a capacitor with a direct voltage source, and wherein said electric field is reduced by discharging said capacitor in response to the irradiation of said gas with said high energy electrons.

3. The invention as defined in claim 2 wherein said gas is passed through said field in a confined passage.

* * * * *